United States Patent
Chien et al.

(10) Patent No.: US 6,560,750 B2
(45) Date of Patent: May 6, 2003

(54) METHOD FOR PROVIDING MASTER-SLAVE HEAT-SWAPPING APPARATUS AND MECHANISM ON A MONO-ATA BUS

(75) Inventors: Horng-Ming Chien, Shuh-Lin (TW); Shang Chen Yeh, Jong-Her (TW); Chang-Ming Lee, Taichung (TW)

(73) Assignee: Promise Technology Inc., Hsinchu (TW)

( * ) Notice: Subject to any disclaimer, the term of this patent is extended or adjusted under 35 U.S.C. 154(b) by 41 days.

(21) Appl. No.: 09/915,313

(22) Filed: Jul. 27, 2001

(65) Prior Publication Data

US 2003/0023797 A1 Jan. 30, 2003

(51) Int. Cl.$^7$ .................. G06F 17/50; G06F 13/20; G06F 13/376; G06F 13/42; G06F 15/177
(52) U.S. Cl. .................. 716/1; 710/302; 710/304; 710/110; 709/209; 709/221; 709/222; 712/31; 712/39; 700/3; 700/12; 700/26
(58) Field of Search .................. 716/1, 8, 302, 716/304; 710/110; 709/209, 221, 222; 700/3, 12, 26; 712/31, 29, 39

(56) References Cited

U.S. PATENT DOCUMENTS

| | | | | | |
|---|---|---|---|---|---|
| 5,581,715 | A | * | 12/1996 | Verinsky et al. | 714/48 |
| 5,586,248 | A | * | 12/1996 | Alexander et al. | 714/22 |
| 5,920,709 | A | * | 7/1999 | Hartung et al. | 710/305 |
| 6,223,229 | B1 | * | 4/2001 | Kvamme | 710/10 |
| 6,460,099 | B1 | * | 10/2002 | Stryker et al. | 710/74 |
| 6,484,290 | B1 | * | 11/2002 | Chien et al. | 716/1 |
| 2002/0052994 | A1 | * | 5/2002 | Khan et al. | 710/300 |
| 2002/0083176 | A1 | * | 6/2002 | Heffernan et al. | 709/225 |
| 2002/0116547 | A1 | * | 8/2002 | Lin et al. | 709/330 |

* cited by examiner

Primary Examiner—Matthew Smith
Assistant Examiner—Phallaka Kik
(74) Attorney, Agent, or Firm—Rabin & Berdo, P.C.

(57) ABSTRACT

The present invention relates to a method for providing a master-slave hot-swapping apparatus and mechanism for use with an ATA bus. A bus controller and a bus separator are employed for isolating the hot-swapping apparatus and the host system, and a power supply switch is used.

4 Claims, 3 Drawing Sheets

METHOD FOR PROVIDING MASTER-SLAVE HEAT-SWAPPING APPARATUS AND MECHANISM ON A MONO-ATA BUS

TECHNICAL FIELD

The present invention relates to a method for providing a master-slave hot-swapping apparatus and mechanism on a mono-ATA (Advanced Technology Attachment) bus. Particularly, a new design for avoiding data confusion caused by cutting off the power supply of master and slave hot-swapping devices, then carrying out a hot-swapping process, reconnecting, and restarting. The new design can overcome problems in swapping.

BACKGROUND OF THE PRESENT INVENTION

The ATA specification is a defined industry standard for ANSI (American National Standards Institute), NCITS (National Committee for Information Technology Standards), and Technical Committee T13 to develop and maintain IDE (Integrated Drive Electronics) hard-disk machines (IDE hard-disk machines are extensively used in PC systems), CD-ROM drives or other ATA/ATAPI devices. The latest specification is ATA/ATA-6, which has defined a set of registers for communication between a host system and its related devices. These related devices are able to complete specifically assigned commands, and can adapt with controlling process and signals as well as transfer protocols. This specification is a regulation for serving the said devices to connect with ATA buses for keeping the devices in normal operation.

Generally speaking, as shown in FIG. 1, an ATA bus (10) has three connectors (11), one to connect to the host system while the other two connect with the master-slave ATA devices (12, 13) through bus separators (14). Therefore, a single or mono-master device (12), a single or mono-slave device (13), or a pair of master and slave devices (12, 13) are allowed to be connected with the ATA bus (10). For a reduction of complexity in the host controller as well as in IDE hard-disk PC machines, a pair of master-slave devices (12,13) can be used with the ATA bus (10). One of the advantages is that the master device (12) and the slave device (13) are entirely controlled by the same bus controller (20) (as shown in drawing 2). Therefore, a lessened number of components can be used in the bus controller (20) to decrease the costs.

When the power supply been switched on, every individual ATA device will self diagnose and, upon completion of the diagnosis, a slave device will report whether its state is normal or not to the master device (12) by emission of signals. If the result of self-diagnosis is normal, a signal will be reported by PDIAG that is at logic "0" potential (namely, at ground potential). Oppositely, if the report is logic "1" potential, this means the self-diagnosis is abnormal. If the host system desires to search the state of the slave device (13), the slave device (13) may be abnormal ornon-existent. Under this situation, the master device (12) must play a role as the slave device (13) and respond to the searching-state for the slave device (13) to the host system.

Hot-swapping can be used in disk arrays or relevant applications fields, in repairing the troubled disk machine(s) so that the power supply of the host system can be still in a power on state, in which the capacities of data processing and the system's stability must be increasing. But, in general, in order for making no damage to the system and its devices under general circumstances, system managers will separate the troubled disk machine(s) from the ATA bus (10) and then take out the troubled disk machine from the system by cut off the power supply. After replacing a disk machine for trouble-shooting, the power supply to the system is turned on again for working. As an example, suppose that a pair of master-slave devices (12,13) are operating on the mono-ATA bus (10), when the master device (12) malfunctions. The power supply is cut off, then the device is shifted out and a new device is reconnected. But the power supply of slave device (13) is still on, so the device (13) will not enter into the mode of self-diagnosis and no result of self-diagnosis will be reported to the master device (12) via PDIAG's signals. Under this circumstance, the just restarted master device (12) must misjudge that the slave device (13) is in a dysfunctional state. Then, as the host system tries to search the state of the slave device (13), the master device (12) will rule and follow the specification of ATA for operating and will play a role as the slave device (13). As a result, the master device (12) and slave device (13) will simultaneous respond to the data on ATA bus (10), which causes data confusion for the host system. So, an adaptable way of hot swapping the master device (12) and slave device (13) on the mono-ATA bus (10) would be desirable.

SUMMARY OF THE INVENTION

Accordingly, a chiefly object of the invention is to provide a method of master-slave hot-swapping-onto an ATA bus, and,means for solving the above mentioned defects of master-slave hot-swapping apparatus in searching error data by the said process of hot swapping.

Accordingly, the invention chiefly consists of a bus controller and a bus separator for isolating the signals coming from the hot swapping in processing by the hot swapping apparatus and the host system. A power supply switch is provided for cutting off the power supply. A logic "0" unit is provided for generating a logic "0" potential with respect to PDIAG's signal of the ATA device, upon completion of the process of hot swapping while the system is restarting. Restated, the feature of the invention is that any power supply of the master-slave hot-swapping device is cut off and the process of hot swapping is carried out, a new device is reconnected and restarted, and the master device will report to the host system that the slave device is in a normal condition. Thus, in the process of hot swapping, the master and slave device will not simultaneously respond with data on the ATA bus, and confused data can be avoided.

The logic "0" unit is resistor with a grounded connection to form a logic "0" with respect to PDIAG's signal for transfer onto the ATA bus. Therefore, extra costs can be avoided and the electric circuits can be simplified.

These objects, the structural design and technical method of the present invention will become apparent and further understood when reference is had to the accompanying drawings and detailed description.

DESCRIPTION OF ITEMS

10—ATA bus
11—connector

14—bus separator
12—master ATA device
13—slave ATA device
20—bus controller
21—power supply switch
22—logic "0" unit.
30—hot-swapping apparatus (an ATA master device or an ATA slave device)

DETAILED DESCRIPTION OF THE PRESENT INVENTION

As mentioned above, an ATA bus (10) has three connectors. One is to connect with the host system and other two are respectively connected with a master device (12) and a device (13). The process of hot swapping is to attempt to shift a certain ATA device out of the ATA bus, but the host system's power supply is still on. The host system and ATA devices can be protected from being damaged or noisy signals by cutting off the power supply. That is, the power supply is cut off and the bus separator (14) is used for isolating all ATA signals from the host system, and then the said devices are shifted out. Hence, safety for all devices of the entire system can be secured. Under such a premise, an example in the present invention will be described with reference to FIG. 2.

Figure 1:
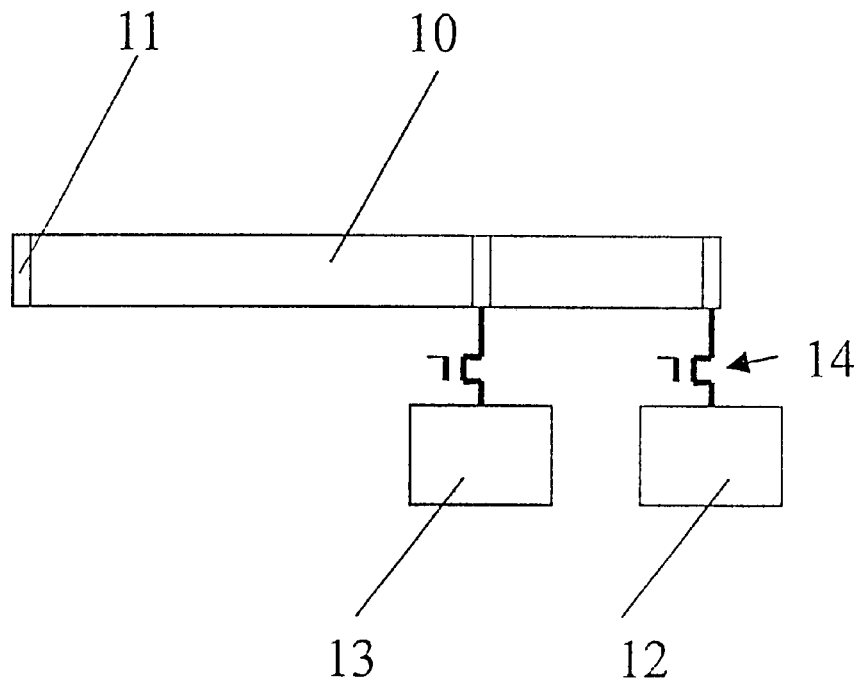
FIG. 1 is a diagrammatic sketch of an ATA bus and its connected devices.
Figure 2:
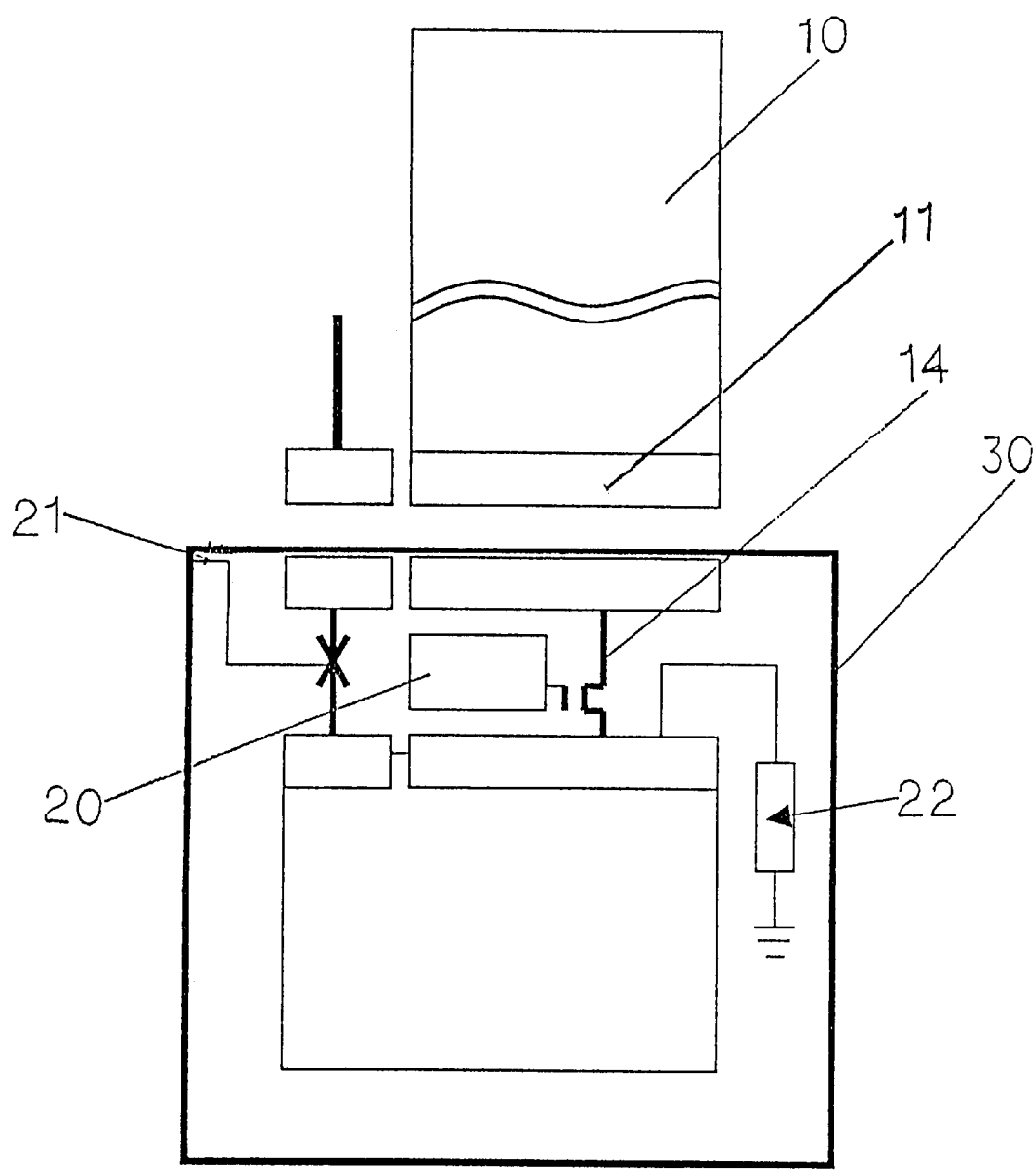
FIG. 2 is a diagrammatic sketch of the structure of an ATA hot-swapping apparatus.

Shown as FIG. 2, the invention provides devices as follows:

A bus controller (20) and a bus separator (14) are used to isolate the signals of the hot-swapping apparatus (30) (such as the master device 12 or the slave device 13) and the host system.

A power supply switch (21) is used for cutting the power supply during the process of hot swapping in the hot-swapping apparatus.

A logic "0" unit (22) is used upon completion of hot swapping, when, while the host system is restarted, it will generate a logic "0" potential for PDIAG.

For example, the logic "0" unit (22) can be a resistor connected between the PDIAG's signals of the hot-swapping apparatus and a grounded wire, by which the PDIAG's signals can be set at logic "0" potential.

Figure 3:
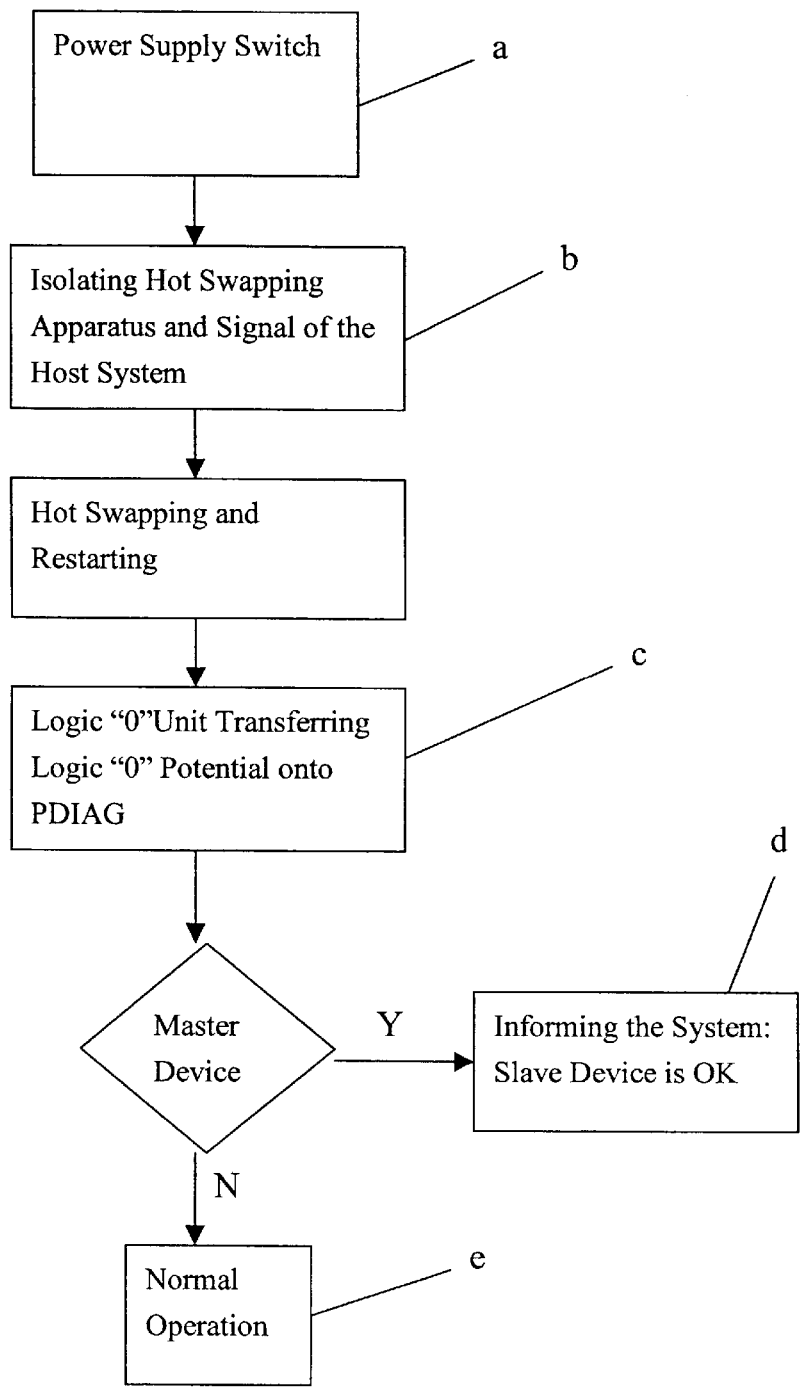
FIG. 3 is a block diagram showing the method of the invention.

Please refer to FIG. 3, which shows a flow chart while a user proceeds to hot-swap either of the master device (12) or the slave device (13). Firstly, the power supply switch (21) must be turned off for setting the hot-swapping apparatus (30) in a no power state to ensure it is in a safe sate (shown as step a). Following that, the connection signals between the hot-swapping apparatus (30) and the host system is cut via the bus controller (20) and bus separator (14) (shown as step b). Then, the old hot-swapping apparatus (30) is disconnected from the bus (10) and replaced by a new hot-swapping apparatus (30), and the host system is restarted. Since the host system is reworked, the logic "0" unit (22) will transfer the logic "0" potential to PDIAG for signal's usage (shown as step c). Hence, the master device (12) will not play a role as the slave device (13), and chaotic data on the bus (10) due to responses from both of the two devices (12,13) will not occur. The logic "0" potential of the logic "0" unit (22) will not interfere with the normal operation (shown as step e). Moreover, self-diagnosis after the re-start of the system can be be conducted using software for searching all devices' states on the ATA's bus (10).

The grounding approach of the "0" unit (22), that is, to directly connect the PDIAG's signal with logic "0" potential, permits a simple and easy electric circuit in the host system for searching the provided logic "0" potential of the master or slave device.

Summarizing the above mentioned, the invention provides a method for providing a master-slave hot-swapping apparatus and mechanism on an ATA bus, and employs a logic "0" potential in conjunction with the PDIAG's signal. The master device does not play a role as, and instead of, the slave device under any situation. Furthermore, the method can avoid the confused data that can result due to hot swapping in the past.

Although the techniques, drawings, programs and control methods of the present invention have been illustrated and described with reference to the preferred embodiments thereof, it should be appreciated that it is in no way limited to the details of such embodiments, but is capable of numerous modifications within the scope of the appended claims.

What is claimed is:

1. An apparatus for providing a master and slave hot-swapping apparatus and mechanism on an ATA bus, comprising:
    a bus controller and a bus separator for isolating signals of the hot-swapping apparatus and a host system while in hot swapping operation;
    a power supply switch for cutting off a power supply during a process of hot swapping with the hot swapping apparatus, and
    a logic "0" unit for connecting a PDIAG's (Passed Diagnostics) signal of the hot-swapping apparatus to a ground conductor, for setting the PDIAG's signal at logic "0" to ensure that a slave device of the hot-swapping apparatus is in normal condition.

2. An apparatus according to claim 1, wherein the logic "0" unit is a resistance.

3. An apparatus according to claim 1, wherein the logic "0" unit is a logic circuit.

4. A method for providing a master-slave hot-swapping apparatus and mechanism on an ATA bus, comprising:
    when a process of hot swapping and restarting a host system are completed, a logic "0" unit generates a logic "0" state onto a PDIAG (Passed Diagnostics) of ATA's devices as signal's usage to respond to the host system that a slave device of the hot-swapping apparatus is normal.

* * * * *